US011671271B2

(12) United States Patent
Ishimoto et al.

(10) Patent No.: US 11,671,271 B2
(45) Date of Patent: Jun. 6, 2023

(54) MECHANISM FOR THE MANAGEMENT OF TOPIC-BASED MULTI-GROUP VIRTUAL CONFERENCES

(71) Applicant: International Business Machines Corporation, Armonk, NY (US)

(72) Inventors: Kenya Ishimoto, Machida (JP); Yoshio Horiuchi, Hiratsuka (JP); Koichi Omae, Tokyo (JP); Masashi Doi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/483,851

(22) Filed: Sep. 24, 2021

(65) Prior Publication Data

US 2023/0098611 A1 Mar. 30, 2023

(51) Int. Cl.
*G06F 15/16* (2006.01)
*H04L 12/18* (2006.01)
*H04L 65/1083* (2022.01)
*G06F 3/04845* (2022.01)
*G06F 3/04817* (2022.01)
*H04L 65/403* (2022.01)

(52) U.S. Cl.
CPC ...... *H04L 12/1822* (2013.01); *G06F 3/04817* (2013.01); *G06F 3/04845* (2013.01); *H04L 65/1083* (2013.01); *H04L 65/403* (2013.01)

(58) Field of Classification Search
CPC ............. H04L 12/1822; H04L 65/1083; H04L 65/403; G06F 3/04817; G06F 3/04845
See application file for complete search history.

(56) References Cited

U.S. PATENT DOCUMENTS 7,124,372 B2 * 10/2006 Brin ..................... H04L 12/1822
715/757
9,961,119 B2 * 5/2018 Bader-Natal .......... H04L 65/403
(Continued)

FOREIGN PATENT DOCUMENTS

CN 100388192 C * 5/2008 ............. G06Q 10/10
JP 201982997 A 5/2019

OTHER PUBLICATIONS

Disclosed Anonymously, "A Method and System for Topic-Based Real-Time Analysis of Multi-Group Discussions in Virtual Meetings," An IP.com Prior Art Database Technical Disclosure, Nov. 9, 2020, IPCOM000264088D, 5 pages.
(Continued)

*Primary Examiner* — Ario Etienne
*Assistant Examiner* — Thorne E Waugh
(74) *Attorney, Agent, or Firm* — Tihon Poltavets; Cantor Colburn LLP

(57) ABSTRACT

Provided are embodiments for a method for managing a multi-group virtual conference. Embodiments can include providing user access to at least one cluster of a plurality of clusters in a virtual conference and determining at least one feature word representing a topic for each of the plurality of clusters. Embodiments can also include displaying in each of the plurality of clusters the at least one feature word and receiving a user input to modify user participation in the at least one cluster. Also provided are embodiments for a system and computer program product for managing the multigroup virtual conference.

17 Claims, 12 Drawing Sheets

(56) References Cited

U.S. PATENT DOCUMENTS

| | | | |
|---|---|---|---|
| 10,075,482 B2* | 9/2018 | Chinnapatlolla | ... H04L 12/1822 |
| 10,972,299 B2* | 4/2021 | Wiener | G06F 16/345 |
| 10,979,672 B1* | 4/2021 | Krol | G06F 3/011 |
| 11,095,857 B1* | 8/2021 | Krol | G06F 3/147 |
| 11,132,110 B1* | 9/2021 | Christensen | H04N 7/15 |
| 11,412,181 B1* | 8/2022 | Han | H04N 7/155 |
| 11,444,989 B1* | 9/2022 | Han | H04N 7/15 |
| 2007/0300165 A1* | 12/2007 | Haveliwala | G06F 3/0482 |
| | | | 715/810 |
| 2009/0119604 A1* | 5/2009 | Simard | G06Q 10/10 |
| | | | 715/757 |
| 2018/0027123 A1* | 1/2018 | Cartwright | H04M 3/42221 |
| | | | 379/202.01 |
| 2019/0098255 A1* | 3/2019 | Bergmann | G06Q 10/1093 |
| 2020/0145616 A1* | 5/2020 | Nassar | H04M 3/567 |
| 2020/0302817 A1* | 9/2020 | Williams | G09B 7/02 |
| 2021/0021558 A1* | 1/2021 | Mahmoud | H04L 51/046 |
| 2022/0255974 A1* | 8/2022 | Berliner | H04L 12/1831 |
| 2022/0261760 A1* | 8/2022 | Cupala | G06Q 10/1095 |
| 2022/0263675 A1* | 8/2022 | Cupala | H04L 65/4015 |
| 2022/0284402 A1* | 9/2022 | Vangala | G06Q 10/107 |
| 2022/0286625 A1* | 9/2022 | Afrasiabi | H04N 5/272 |
| 2022/0321369 A1* | 10/2022 | Lin | H04L 12/1822 |
| 2023/0032922 A1* | 2/2023 | Lin | H04L 12/1818 |

OTHER PUBLICATIONS

Disclosed Anonymously, "Method and System for Enhancing Communication Among Users in a Video-Conference Setting Based on Real Time Topic Recognition," An IP.com Prior Art Database Technical Disclosure, Dec. 14, 2018, IPCOM000256615D, 6 pages.

* cited by examiner

MECHANISM FOR THE MANAGEMENT OF TOPIC-BASED MULTI-GROUP VIRTUAL CONFERENCES

BACKGROUND

The present invention relates to virtual conferences, and more specifically, to a mechanism for the management of topic-based multi-group virtual conferences.

In today's environment, the demand for conducting virtual conferences, lectures, posters sessions, etc. is increasing. Although web-based meetings have been adopted as a mainstream tool to support virtual conferencing, the current web-based meetings are configured to make all participants focus on one topic and are therefore not efficient at supporting different chat groups among several participants that may occur simultaneously within the web-based meetings. Web-based meeting systems are configured to share a single topic by all participants of the meeting.

SUMMARY

Embodiments of the present invention are directed to a computer-implemented method for the management of topic-based multi-group virtual conferences. A non-limiting example of the computer-implemented method includes providing user access to at least one cluster of a plurality of clusters in a virtual conference and determining at least one feature word representing a topic for each of the plurality of clusters. The method can also include displaying in each of the plurality of clusters the at least one feature word and receiving a user input to modify user participation in the at least one cluster.

Embodiments of the present invention are also directed to a system and computer program product for the management of topic-based multi-group virtual conferences.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
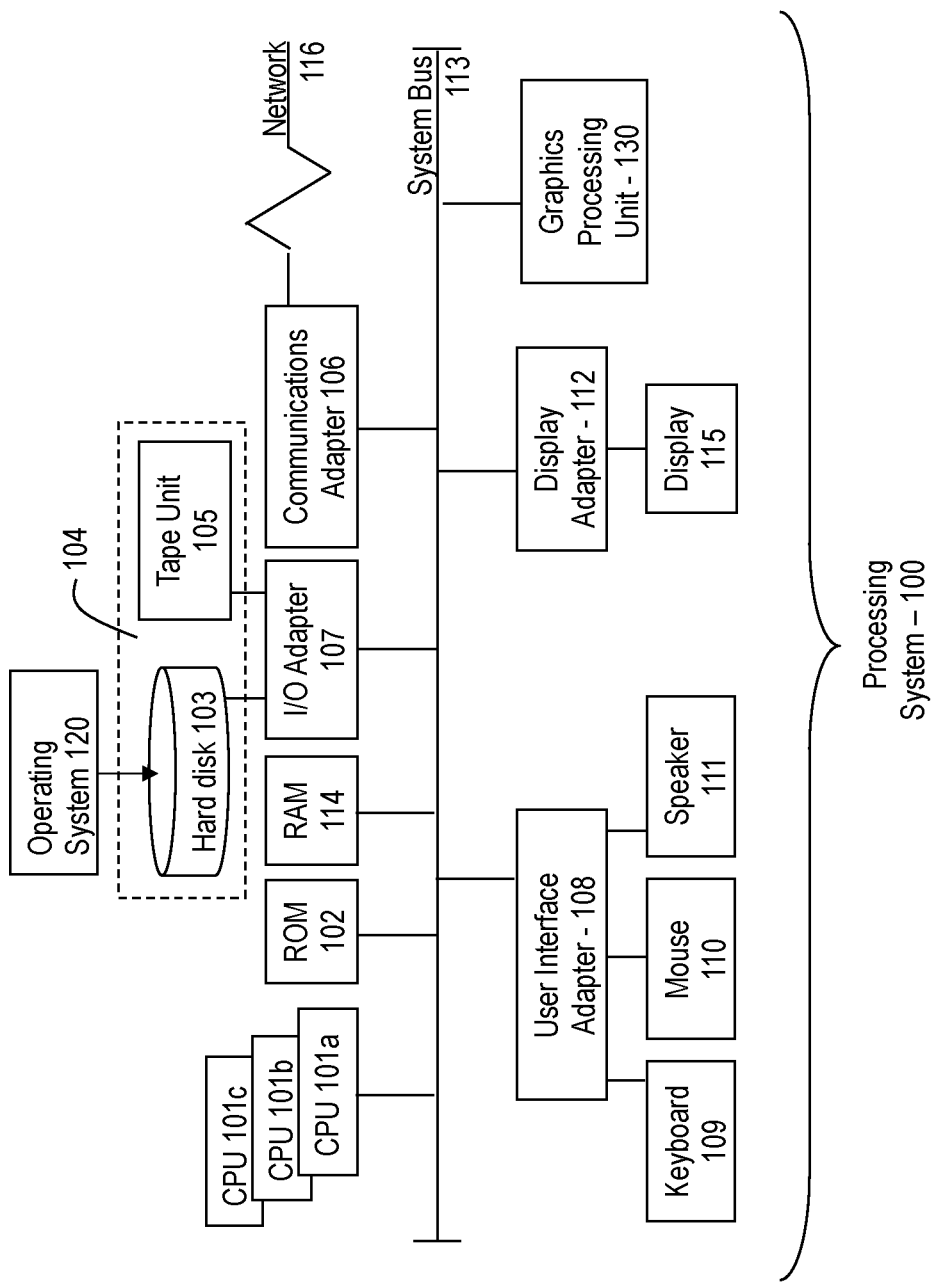
FIG. 1 depicts a system for practicing the embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, current web-based applications for meetings are configured to allow the members to focus on one topic. Therefore, there is no viable application for supporting multiple groups among several members simultaneously within the site which allows users the flexibility to switch to different groups within the conference.

Turning now to an overview of the aspects of the invention, one or more embodiments of the invention address the above-described shortcomings of the prior art by providing a multi-group or multi-cluster teleconference which allows the users to actively participate in multiple groups and switch clusters without the administrator of the conference having to intervene to set up a new group.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
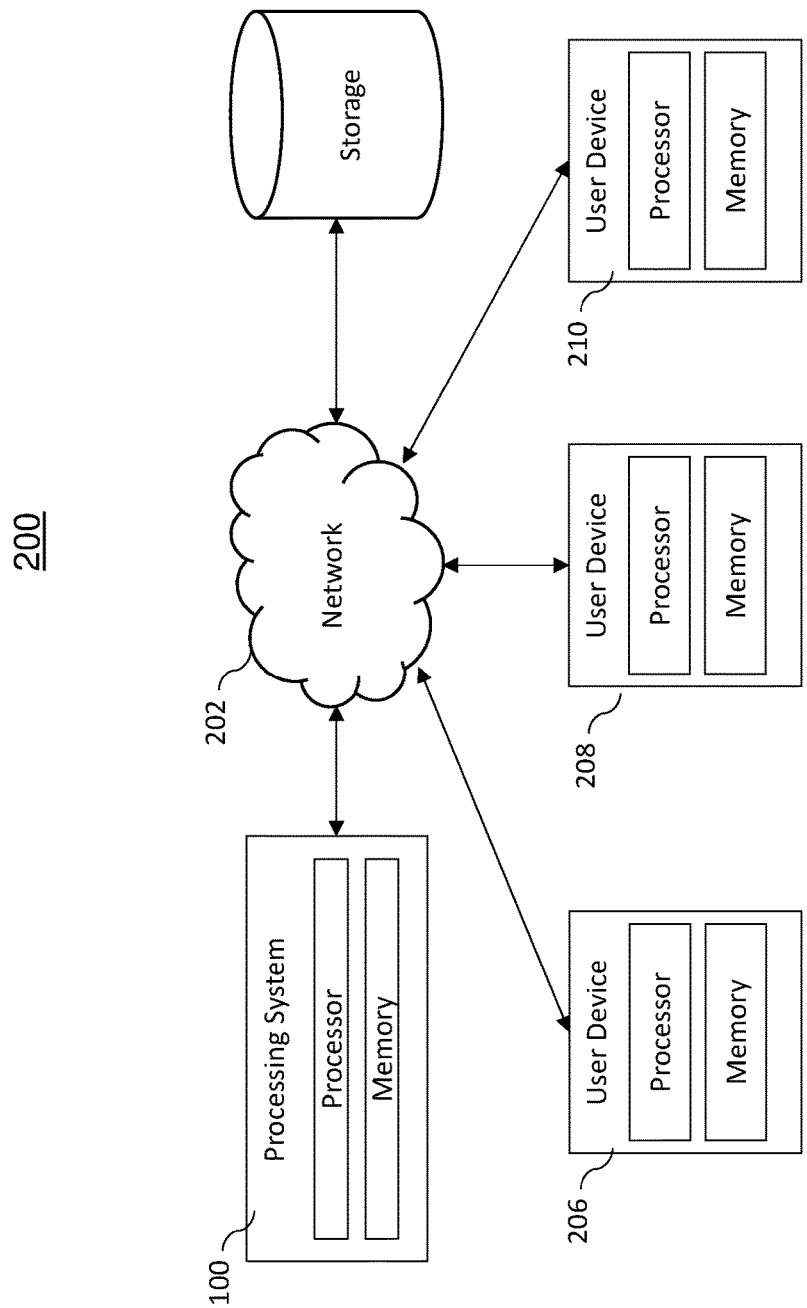
FIG. 2 depicts a conferencing system in accordance with one or more embodiments of the invention.

FIG. 2 illustrates an example conferencing system 200 including the processing system 100 of FIG. 1 in accordance with one or more embodiments of the invention. As shown the conferencing system 200 connects a plurality of participants in a virtual conference using their associated devices. Conferencing system 200 is a network of computers or user devices in which embodiments of the invention may be implemented. Conferencing system 200 contains a network 102, which is the medium used to provide communications links between various devices and computers connected together within distributed data conferencing system 200. Network 202 may include permanent connections, such as wire or fiber optic cables, or temporary connections made through telephone connections.

In the depicted example, a processing system 100 is connected to network 202 along with storage unit. In addition, user devices 206, 208, and 210 also are connected to network 202. These user devices 206, 208, and 210 may be, for example, personal computers, smart devices, or network computers. For purposes of this application, a network computer is any computer, coupled to a network, which receives a program or other application from another computer coupled to the network. In the depicted example, processing system 100 provides data, such as applications for virtual conferencing, to user devices 206, 208, and 210. User devices 206, 208, and 210 are clients to processing system 100. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, conferencing system 200 also may be implemented over a number of different types of networks, such as for example, an intranet, a local area network (LAN), or a wide area network (WAN). FIG. 2 is intended as an example, and not as an architectural limitation for the present invention.

The conferencing system 200 enables each participant is allowed to switch from a first cluster to which they belong by moving the participant's own icon. Thus, changing a positional state of the icon within the two-dimensional map provided on an interface of a user device, or the user is allowed to switch clusters by explicitly selecting another cluster. In one or more embodiments of the invention, the discussion among participants in a cluster is presented to the participant at a fixed volume. A lower volume is set for discussion in an adjacent cluster based on the participant positional state on the map. Discussions in a cluster which is far away may not be audible.

When a cluster is determined or there is a change in participants, the conferencing system 200 obtains a list of participants belonging to the cluster and obtains a history of remarks of each participant for a certain period in the past. The remarks of each participant made when the participant was not near a cluster may be deleted from a history of remarks in the cluster. Also, remarks made by a person for a certain period in the part who is not regarded as currently participating in a cluster but who was near the cluster when the remarks were made may be included in a history of remarks in the cluster. Analyzing the history of remarks in a cluster to obtain a feature word which is displayed as a topic of the cluster in association with the cluster on the two-dimensional map which is discussed with further reference to FIG. 4. This allows participants to refer to a topic of each cluster at any time and easily participate in a cluster with a topic of interest in progress. The topics for each cluster may be contrasted by changing displayed character decorations etc. based on respective degrees of importance. For example, degrees of importance may be determined by whether to match a listed feature word corresponding to a predetermined object of interest (hereinafter referred to as a word as the object of interest).

Figure 3:
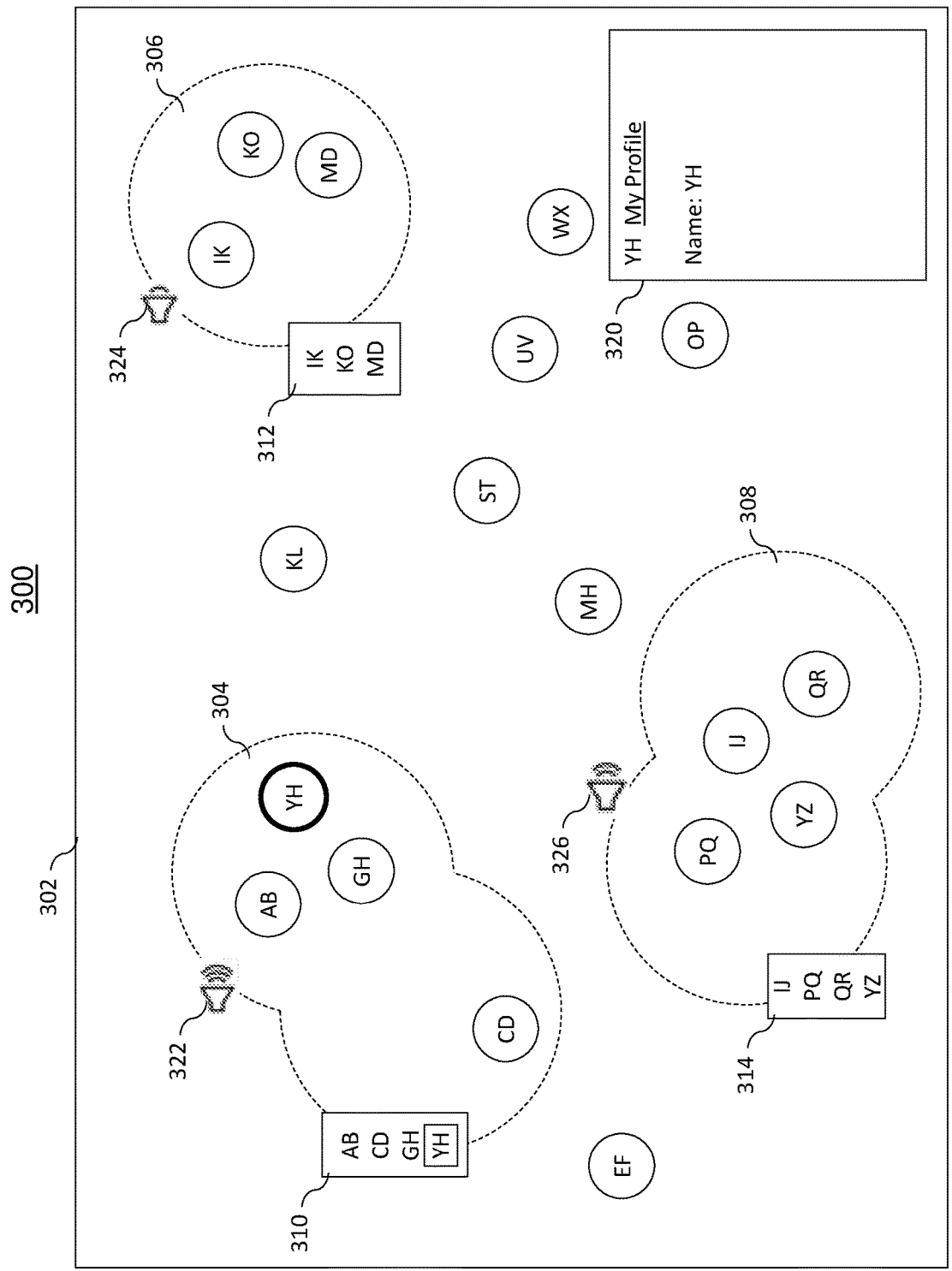
FIG. 3 depicts a map for managing a multi-group virtual conference in accordance with one or more embodiments of the invention.

FIG. 3 illustrates an example two-dimensional map (hereinafter referred to as "map 300") provided on a display 302 of a user device to participate in a virtual conference in accordance with one or more embodiments of the invention. As shown in FIG. 3, the map 300 represents a single virtual conference that will begin or is currently in progress. The virtual conference represented in the display 302 includes a plurality of clusters 304, 306, and 308, where each cluster 304, 306, and 308 represents a group of participants that a participant may join at any time during the conference without interrupting the facilitator of the conference. Although the virtual conference includes 3 different clusters 304, 306, and 308, it should be understood that any number of clusters and participants can be used in the virtual conference.

The participants that are currently assigned or participating with each respective cluster is shown. The participant can participate in the current cluster. Participation can include but is not limited to voice, video, whiteboarding, and screen sharing. As the participant joins a different cluster the participant is able to participate with the other clusters. The participants can be represented by an icon or avatar, where each participant may be identifiable by their initials or another identifier. The cluster 304 includes the icons representing 4 participants (AB, GH, YH, CD), and a list 310 of participants is displayed in each of the clusters 304, 306, and 308. Similarly, cluster 306 includes the participants (IK, KO, MD), and the cluster 308 includes the participants (PQ, IJ, YZ, QR). The list 312 of participants corresponds to the participants of cluster 306, and the list 314 of participants corresponds to the participants of cluster 308. The other users (EF, KL, ST, MH, UV, WX, OP) are not actively participating in any of the clusters 304, 306, and 308.

In this non-limiting example, the participant (YH) is highlighted to indicate the perspective view on the participant's user device. The user profile 320 for participant (YH) is displayed. The user profile 320 can include various details of the participant. In one or more embodiments of the invention, the participant can register a word(s) of interest in their user profile. If the conferencing system 200 determines a feature word for a cluster matches a registered word of interest in a user profile, the cluster can highlight the feature word(s) in the map (shown in FIG. 5) to indicate the cluster is currently discussing the topic.

In one or more embodiments of the invention, the participants can flexibly join or switch clusters to participate in a different topic of conversation without the intervention of a conference administrator opening different chat sessions or sub-groups for the virtual conference. In addition, the processing system 100 can receive inputs from a user device that desires to participate in simultaneous clusters. The participant can audibly or visibly listen to two or more discussions from different clusters. For example, the participant (YH) is currently a participant in cluster 304, so the volume 322 is indicated at maximum volume and the participant (YH) can listen to the cluster 306 at a minimum volume indicated by volume 324. The participant (YH) can further listen to cluster 308 at a volume 326 between the range of volume 322 and volume 324. In some embodiments, the participant may desire to listen to one or more clusters while reading a transcript of another cluster. It can be appreciated that the user can select the clusters for participation, the volume levels for audio, and/or the ability to receive a transcript of any of the clusters 304, 306, and 308.

Figure 4:
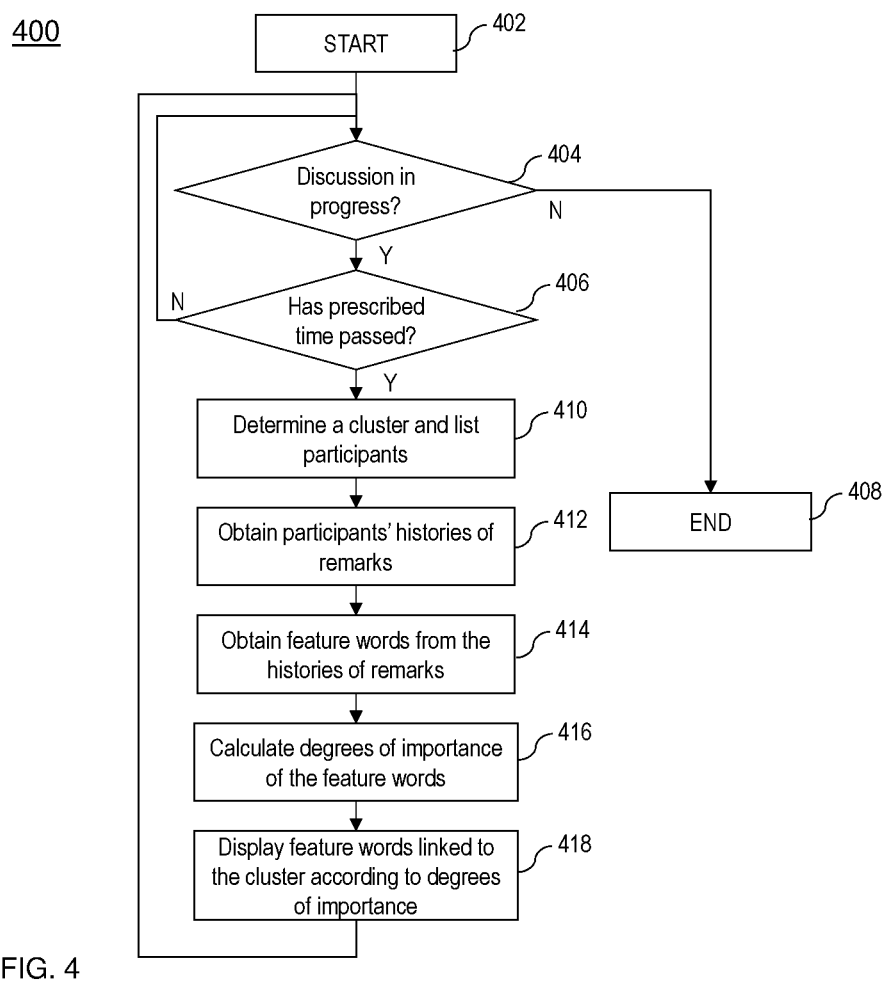
FIG. 4 depicts a flowchart of a method for determining a feature word for each cluster of the virtual conference in accordance with one or more embodiments of the invention.

FIG. 4 depicts a flowchart of a method 400 for determining feature words for each cluster in accordance with one or more embodiments of the invention. The method 400 can be implemented in the conferencing system 200 shown in FIG. 4.

The method 400 can be executed in the processing system 100 shown in FIG. 1. The method 400 begins at block 402 and proceeds to block 404 to determine if a discussion is in progress. If so ("Yes" branch), the method 400 proceeds to block 404. If no discussion is in progress ("No" branch), the method 400 proceeds to block 408 and ends. At block 406, the processing system 100, determines if a prescribed time has passed. The during this time, the processing system 100 is analyzing the discussions. The prescribed time can be a configurable time period such as 1 minute, 2 minute, 5 minute, etc. increments. It can be appreciated the configure time period can be any time and not limited by the example.

If the prescribed time period has expired, the method 400 returns to block 404. Otherwise, the method 400 proceeds to block 410 to determine a cluster and a list of its participants. The cluster can be determined by the processing system 100 using known techniques such as, for example, hierarchical clustering. At block 412, the remarks from each participants' histories are obtain and at block 414, the features words from the histories of remarks are obtained. At block 416, the processing system 100 calculates degrees of importance for the feature words. The degrees of importance can be determined by the processing system 100 for each of the clusters.

In one or more embodiments of the invention, the feature words for discussions in each of the clusters are determined from historical remarks or transcripts for each cluster. The feature words for each of the clusters can be determined using a variety of techniques including natural language processing. For example, the frequency of appearance of a word or phrase can be used to calculate a degree of importance. The degree of importance may be determined by obtaining the number appearances per unit time for the extracted feature words. Calculating the frequency of appearance of a feature word based on the ratio thereof occupying the number of appearances of the feature words. In a non-limiting example, if the number of appearances for the complete feature word is provided as N and the number of appearances of a certain feature word is M, the M/N is calculated to determine a degree of importance of the feature word.

In one or more embodiments of the invention, the degree of importance provides a weight given to each feature word. The degree of importance can be calculated from the similarity to the word as the object of interest from a user's profile.

Scores can be given in advance to words that are similar to the object of interest established in each cluster. A degree of importance for each feature word can be calculated from a score of a word as the object of interest when the feature word matches the word as the object of interest. In some embodiments, the score can be reduced according to a ratio of mismatch when a feature word partially matches a word as the object of interest. For example, when the matching rate is 80%, the score is multiplied by 0.8. Also, when a feature matches several words as the object of interest, resulting scores may be accumulated.

In one or more embodiments of the invention, when there is a word of interest registered in a participant's profile differently from a word as the object of interest established in the cluster, similar processes may be adopted to accumulate a resulting score to the degree of importance.

In one or more embodiments of the invention, the degree of importance may be determined from a weighted sum of a degree of importance calculated from a word as the object of interest and a degree of importance calculated from the number of appearances of a feature word.

At block 418, the method 400 displays feature words linked to the cluster according to the degrees of importance. Responsive to determining the feature word for each of the respective clusters, the feature word(s) can be displayed in each of the respective clusters to identify the topic(s) of discussion for each cluster. A plurality of features words can be provided in each of the clusters. This informs participants of the various clusters that they may want to participate in.

Figure 5:
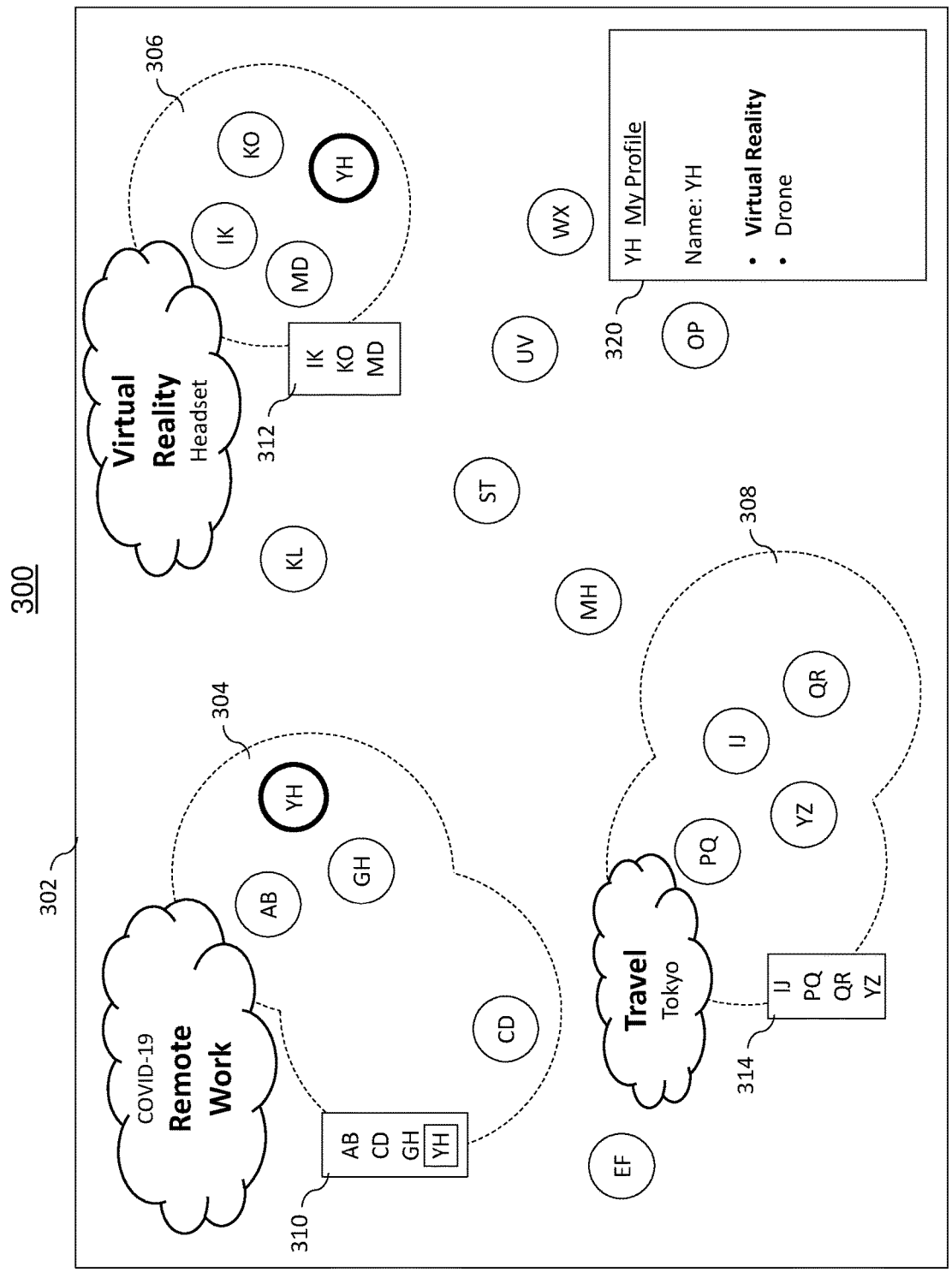
FIG. 5 depicts an updated map used for managing a multi-group virtual conference in accordance with one or more embodiments of the invention.

FIG. 5 illustrates the map 300 displaying the determined feature words for the respective clusters 304, 306, and 308 in accordance with one or more embodiments of the invention. In a non-limiting example, the feature words for cluster 304 that is determined by the method 400 shown in FIG. 4 include "remote work." The determined feature words for cluster 306 include "virtual reality" and "headset." The determined features words for cluster 308 include "travel" and "Tokyo." In this non-limiting example, a word or topic of interest is registered in the user's profile 320. The processing system 100 can highlight the feature word "virtual reality" in cluster 306 to indicate a match with the user's interest in the user profile 320.

Figure 6:
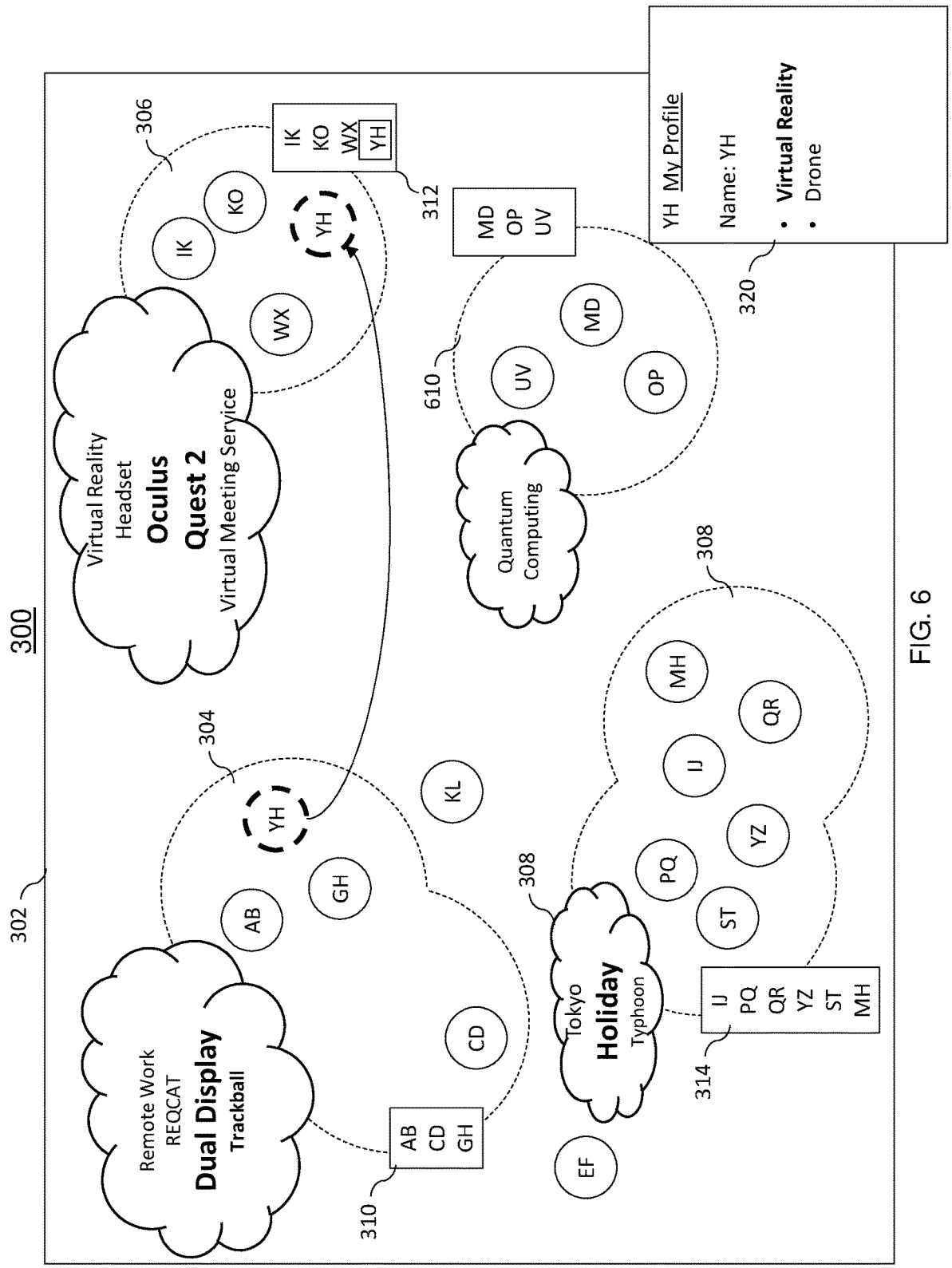
FIG. 6 depicts an updated map used for managing a multi-group virtual conference in accordance with one or more embodiments of the invention.

FIG. 6 illustrates an update to the map 300 displaying the relocation of the participants and the updated feature words for each cluster in accordance with one or more embodiments of the invention. In one or more embodiments of the invention, the participants can move their icon and or avatar which can be provided to the conferencing system 200 by a user input. In this non-limiting example, the participant (YH) has moved their icon using their user device from cluster 304 to cluster 306 indicated by the dashed line. The icon can be moved to any available cluster or moved any distance therebetween. As the participant moves closer to another cluster, the volume of the audio on the user device can be adjusted. For example, the closer the icon is to a cluster, the louder the volume is. The further away the icon is from a cluster, the lower the volume is. In an example, where the maximum volume is represented as a level 10 and the minimum volume is represented as the level 0, the volume can be adjusted as the distance of the participant's icon to one or more clusters is changed. In a non-limiting example, the volume can be proportionally modified to the distance to the respective cluster. Alternatively, the user can select the volume levels to participate in the one or more clusters. The user can also participate in multiple clusters and receive audio from the multiple clusters. In other embodiments, the user can selectively receive the transcript from a first cluster and listen to the audio of another cluster.

The list of participants for each of the clusters can be updated and displayed on the user device. The feature words for each of the clusters can be periodically updated. Also shown in FIG. 6, a new cluster 610 is formed and the feature word that has been determined according to the method of FIG. 4 is "quantum computing."

Figure 7:
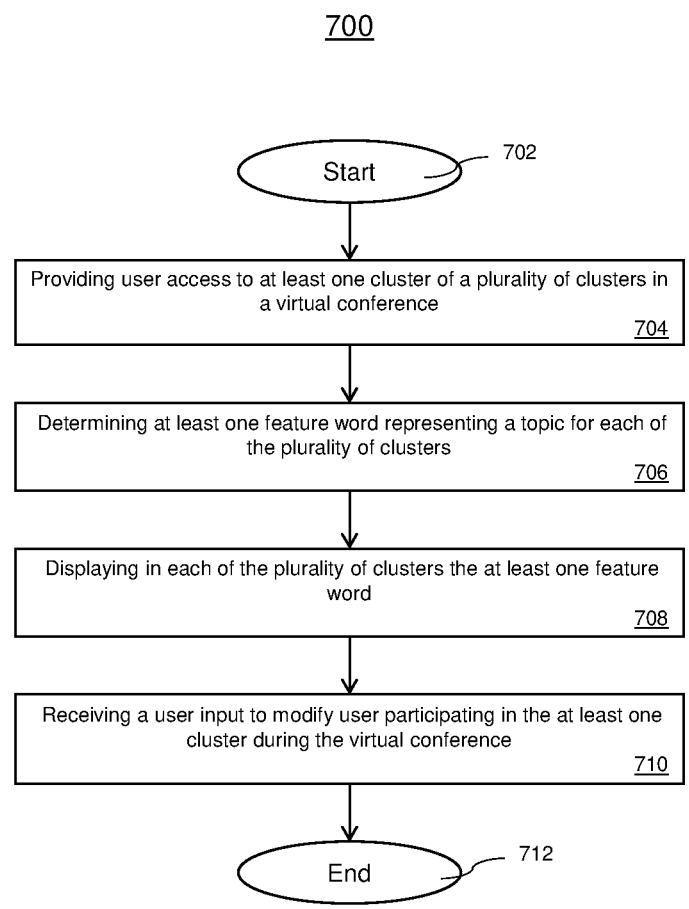
FIG. 7 depicts a flowchart of a method for managing a multi-group virtual conference in accordance with one or more embodiments of the invention.

FIG. 7 illustrates a flowchart of a method 700 for managing topics in a multi-group virtual conference in accordance with one or more embodiments of the disclosure. The method 700 can be implemented in the processing system 100 such as that shown in FIG. 1. The method 700 begins at block 702 and proceeds to block 704 which includes providing a user access to at least one cluster of a plurality of clusters in a virtual conference. Block 706 determines at least one feature word representing a topic for each of the plurality of clusters. Block 708 displays in each of the plurality of clusters the at least one feature word. In one or more embodiments of the invention, the processing system 100 displays a map representing the conference, the plurality of clusters, and the corresponding participants. In addition, the determined feature words can be displayed for each feature word. Block 710 receiving a user input to modify user participation in the at least one cluster. In one or more embodiments of the invention, the modification of user participation can include but is not limited to joining one or more different clusters. The user input can include a drag-and-drop feature to move an icon on the map to a different cluster or proximate to a different cluster. The method 700 ends at block 712.

Figure 8:
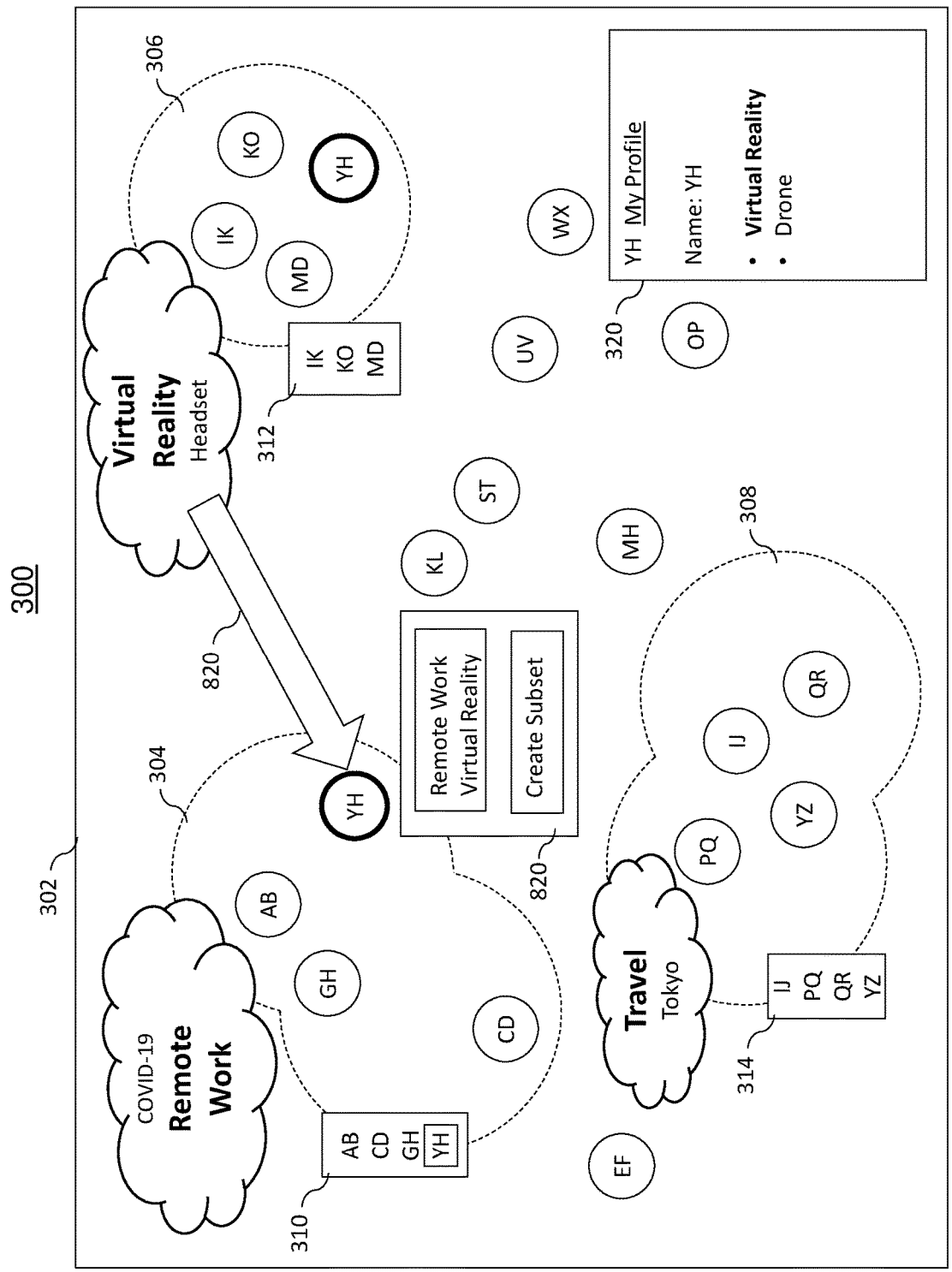
FIG. 8 depicts creating a subset for multiple clusters of interest in accordance with one or more embodiments of the invention.

FIG. 8 illustrates creating a subset for multiple clusters of interest in a map 300 in accordance with one or more embodiments of the invention. The subset map 910 can be created by selecting multiple clusters of interest and adding the selected clusters to a subset. In this example, a subset map 910 combining the cluster 306 for the virtual reality and the cluster 304 for the remote work can be created. The selection by the participant is represented by the arrow 820 shown which associates the clusters 304, 306 and drags the clusters toward the participant's icon (YH). In further embodiments, a user interface 810 can provide an option to confirm the subset map 910 includes the appropriate clusters. Upon confirmation, the selection of clusters can be completed. Although only two clusters are shown to be combined into a submap, it should be understood that any number of clusters can be added or removed from the submap.

Figure 9:
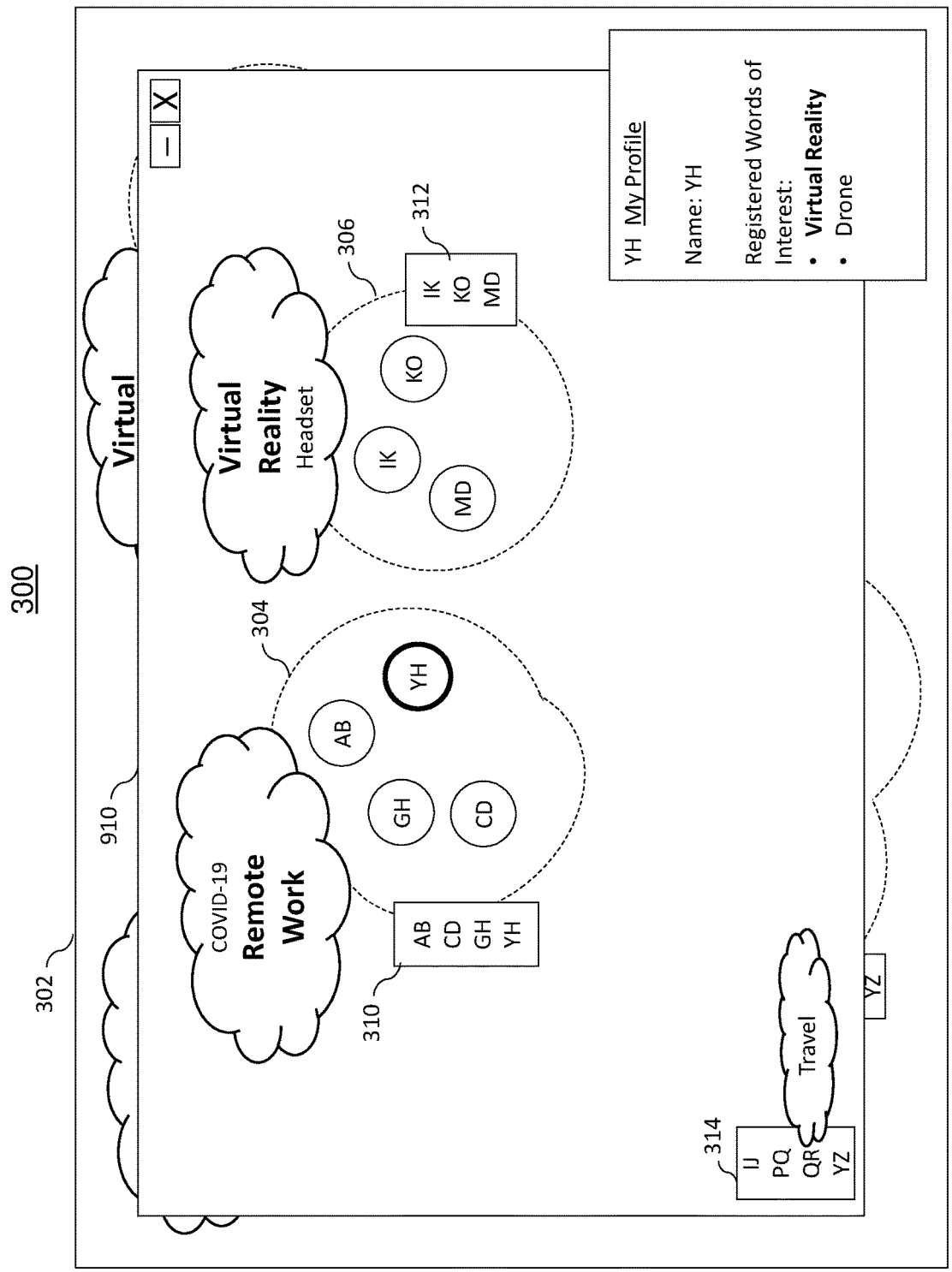
FIG. 9 depicts a subset map of selected clusters that has been overlaid on the original map in accordance with one or more embodiments of the invention.

FIG. 9 depicts a subset map 910 of selected clusters that has been overlaid on the map 300 in accordance with one or more embodiments of the invention. In a non-limiting example, the icons and clusters can be copied from the map 300 and repositioned in the subset map 910. In this non-limiting example, the subset map 910 is overlaid on the map. The position of the clusters 304, 306, and 308 can be freely changed on the subset map 910. By moving the clusters of interest the participate is able to participate in both clusters simultaneously or modify their level of participation at any time during the conference.

The unselected clusters, in this example cluster 308, can be displayed on the edge of the subset map 910. It should be understood the selected clusters in the subset map 910 may be edited at any time during the conference. Also, it should be understood that the clusters can be selected and deselected.

Figure 10:
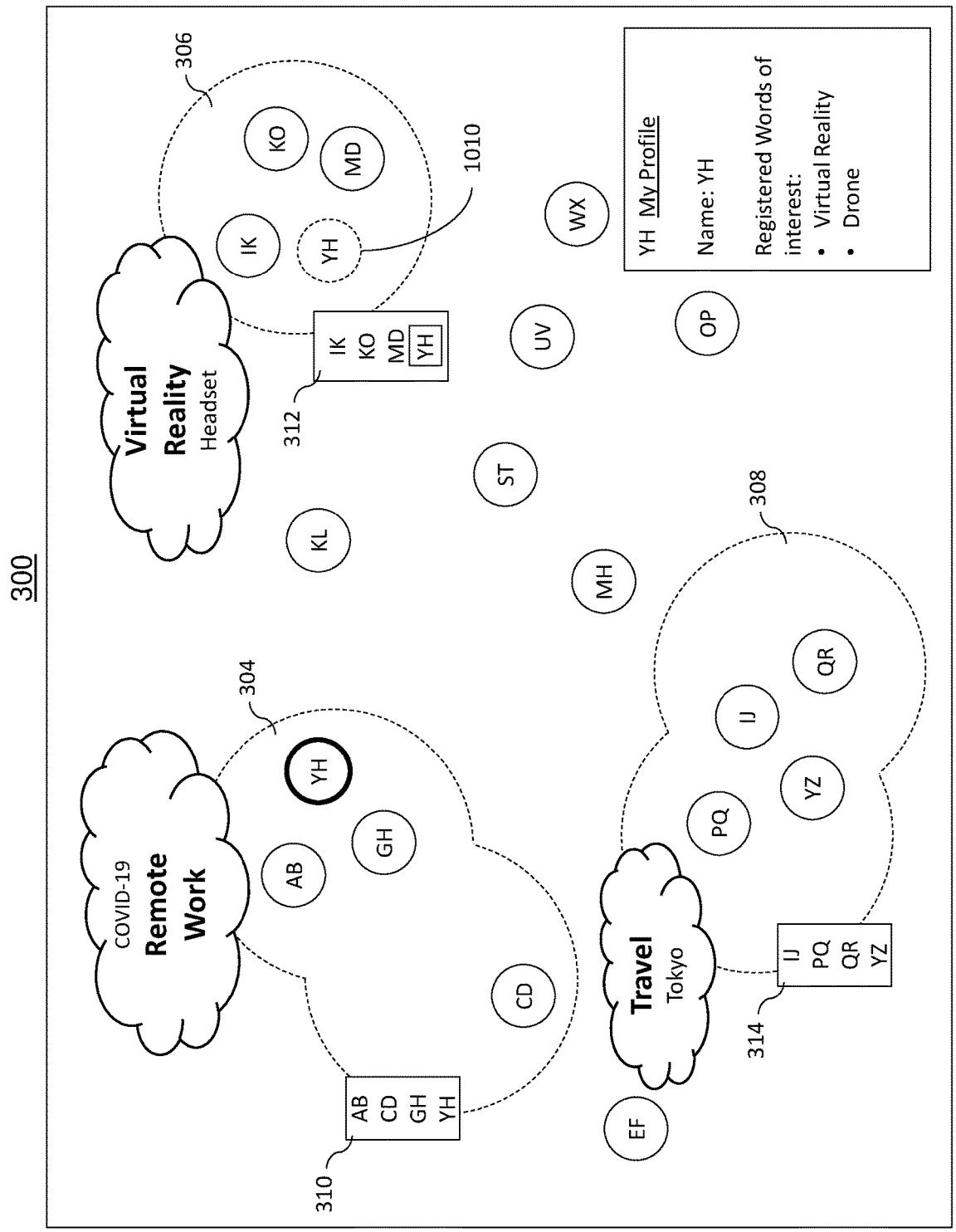
FIG. 10 depicts a perspective view of a map having a double of a participant's avatar in multiple clusters in accordance with one or more embodiments of the invention.

FIG. 10 depicts a perspective view of a map having a double of a participant's icon (YH) in multiple clusters in accordance with one or more embodiments of the invention. As shown in this example, the perspective view may illustrate a double 1010 for the icon (YH) of the user participating in cluster 304 and 306. It should be understood that the participant YH can participate in a plurality of clusters and the icon YH would be reproduced and shown in each of the corresponding clusters when viewed from different participant's perspective.

Figure 11:
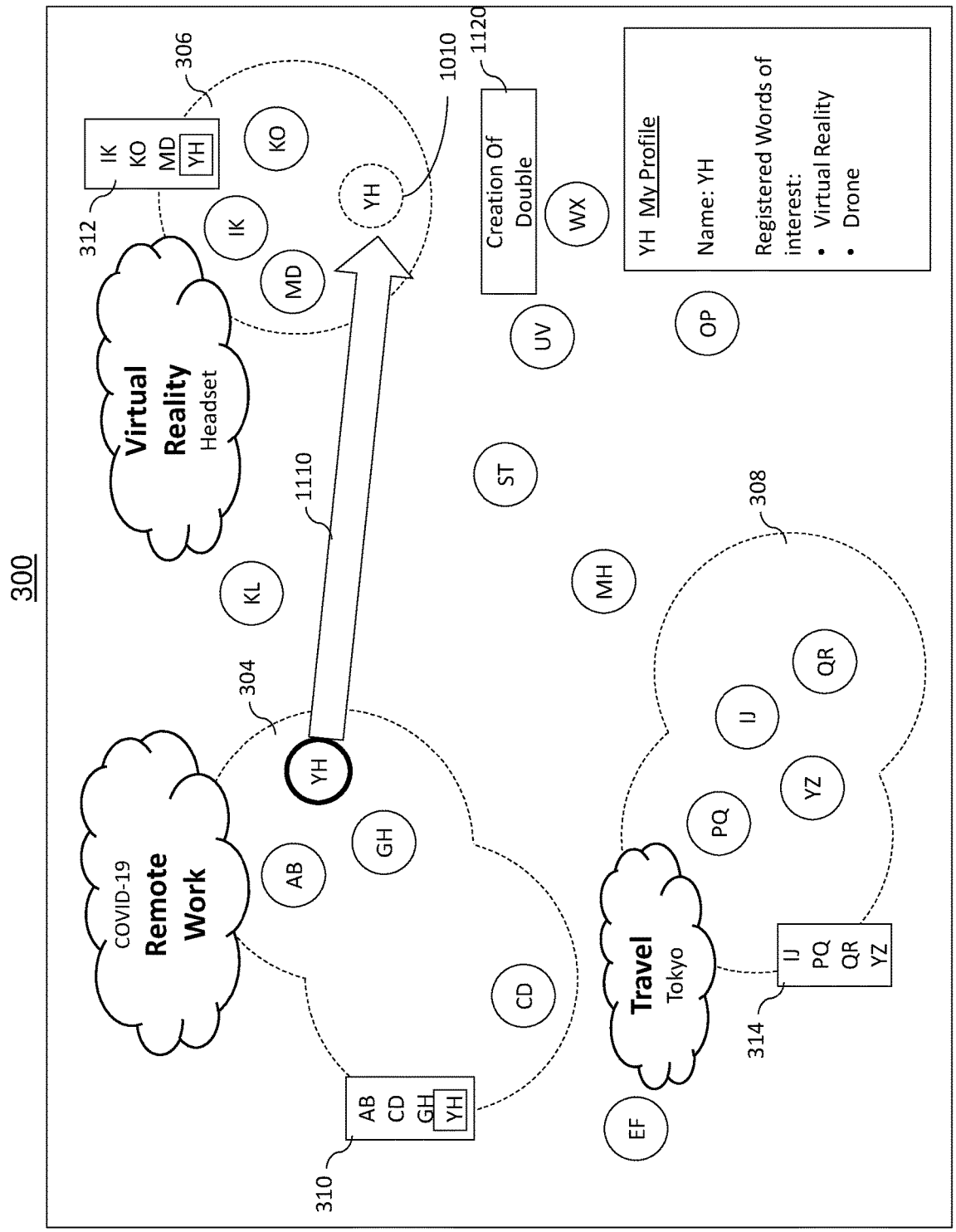
FIG. 11 depicts the creation of a double of an avatar in multiple clusters in accordance with one or more embodiments of the invention.

FIG. 11 depicts the creation of a double of an avatar in multiple clusters in accordance with one or more embodiments of the invention. A user input can be provided to the system 100 to trigger the creation of the double 1010. The participant's double 1010 can be created by dragging (represented by the arrow 1110) the participant's icon to multiple icons. In some embodiments, a user interface 1120 can be provided to the participant to confirm the generation of the double 1010 in multiple clusters.

Figure 12:
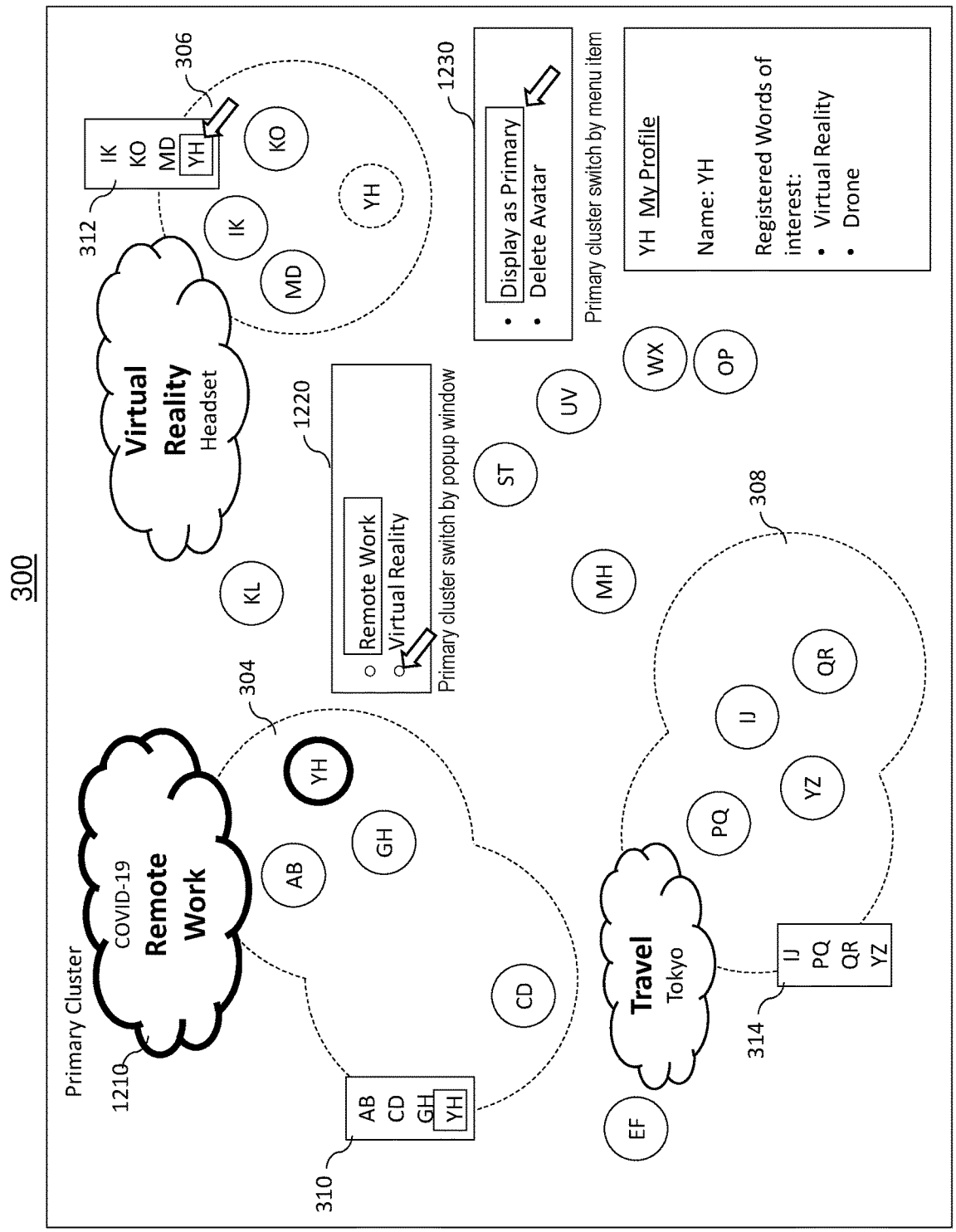
FIG. 12 depicts the selection of a primary and secondary clusters of interest in accordance with one or more embodiments of the invention.

FIG. 12 depicts the selection of a primary and secondary clusters of interest in accordance with one or more embodiments of the invention. In one or more embodiments of the invention, the user can select the primary cluster 1210 of interest. The primary cluster can be selected user the user interface 1220 and 1230. Actions, impacting the level of participation, can be configured so that priority is given to primary clusters with limitation imposed on other clusters. For example, a user's voice can be heard at a sufficient volume in the primary cluster of interest while the volume is limited or reduced in a different cluster. In another example, when using virtual reality (VR) googles, the primary cluster 1210 can be seen as normal in one's visual sense whereas clusters are displayed in semitransparent layers or separate small windows, or one's own avatar in the primary cluster can be seen as normal when viewed from other members but it is displayed in a grayscale of semi-transparent image in other clusters, etc.

The techniques described herein enables users the flexibility to move from one cluster to another. In addition, the techniques described herein enable users to simultaneously participate in a plurality of clusters. In addition, the user is enable to flexibly control the user settings for each cluster.

The techniques described herein also provide a map and user interface to enable the user efficiently switch or select different clusters for communication.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for managing a multi-group virtual conference, the computer-implemented method comprising:
    representing the virtual conference as a two-dimensional map;
    providing, by a processing, user access to at least one cluster of a plurality of clusters in the virtual conference via an icon that can be placed by a respective user within the two-dimensional map, wherein a relative location of the respective icon within the two-dimensional map determines a volume of other users in the plurality of clusters;
    determining at least one feature word representing a topic for each of the plurality of clusters;
    displaying in each of the plurality of clusters the at least one feature word; and
    receiving a user input to modify user participation in the at least one cluster, the user input comprising a change in the relative location of the respective user's icon within the two-dimensional map.

2. The computer-implemented method of claim 1, further comprising displaying the two-dimensional map that includes the plurality of clusters and respective users participants in each of the plurality of clusters.

3. The computer-implemented method of claim 2, wherein displaying the two-dimensional map further comprises displaying the at least one feature word representing a topic for each of the plurality of clusters.

4. The computer-implemented method of claim 1, wherein the user input modifies a distance between the respective icon and the at least one cluster of the plurality of clusters on the two-dimensional map.

5. The computer-implemented method of claim 4, further comprising automatically adjusting a volume of a discussion in each cluster of the plurality of clusters based at least in part on the distance.

6. The computer-implemented method of claim 1, further comprising updating the at least one feature word for each of the plurality of clusters after a period of time during the virtual conference.

7. A system for managing a multi-group virtual conference, the system comprising:
    a computer-readable storage medium having stored thereon a computer-readable instruction and one or more processors for executing the computer-readable instruction, the computer-readable instruction controlling the one or more processors to perform operations comprising:
    represent the virtual conference as a two-dimensional map;
    provide user access to at least one cluster of a plurality of clusters in the virtual conference via an icon that can be placed by a respective user within the two-dimensional map, wherein a relative location of the respective icon within the two-dimensional map determines a volume of other users in the plurality of clusters;

determine at least one feature word representing a topic for each of the plurality of clusters;

display in each of the plurality of clusters the at least one feature word; and receive a user input to modify user participation in the at least one cluster during the virtual conference, the user input comprising a change in the relative location of the respective user's icon within the two-dimensional.

8. The system of claim 7, wherein the processor is configured to display the two-dimensional map that includes the plurality of clusters and respective users participants in each of the plurality of clusters.

9. The system of claim 8, wherein displaying the two-dimensional map further comprises displaying each of the plurality of clusters displays the at least one feature word representing a topic for each of the plurality of clusters.

10. The system of claim 8, where the processor is configured to update the at least one feature word for each of the plurality of clusters after a period of time during the virtual conference.

11. The system of claim 7, wherein the user input modifies a distance between the respective icon the at least one cluster of the plurality of clusters on the two-dimensional map.

12. The system of claim 11, wherein the processor is configured to automatically adjust a volume of a discussion in each cluster of the plurality of clusters based at least in part on the distance.

13. A computer program product for managing a multi-group virtual conference, the computer program product comprising:

a computer-readable storage medium having stored thereon first program instructions executable by a processor to cause the processor to:

represent the virtual conference as a two-dimensional map;

provide user access to at least one cluster of a plurality of clusters in the virtual conference via an icon that can be placed by a respective user within the two-dimensional map, wherein a relative location of the respective icon within the two-dimensional map determines a volume of other users in the plurality of clusters;

determine at least one feature word representing a topic for each of the plurality of clusters; display in each of the plurality of clusters the at least one feature word;

receive a user input to modify user participation in the at least one cluster during the virtual conference, the user input comprising a change in the relative location of the respective user's icon within the two-dimensional map; and display the two-dimensional map including presenting the plurality of clusters and respective users participants in each of the plurality of clusters.

14. The computer program product of claim 13, wherein the user input modifies a distance between the respective icon and the at least one cluster of the plurality of clusters on the two-dimensional map.

15. The computer program product of claim 14, wherein the instructions executable by a processor causes the processor to automatically adjust the volume of a discussion in each cluster of the plurality of clusters based at least in part on the distance.

16. The computer program product of claim 13, wherein displaying the two-dimensional map further comprises the at least one feature word representing a topic for each of the plurality of clusters.

17. The computer program product of claim 13, wherein the instructions executable by a processor causes the processor to update the at least one feature word for each of the plurality of clusters after a period of time during the virtual conference.

* * * * *